(12) United States Patent
Van der Sijde et al.

(10) Patent No.: US 11,936,973 B2
(45) Date of Patent: Mar. 19, 2024

(54) PULSE CHAIN-DRIVEN INFRARED IMAGING ASSEMBLY

(71) Applicant: Lumileds LLC, San Jose, CA (US)

(72) Inventors: Arjen Gerben Van der Sijde, Eindhoven (NL); Erno Fancsali, Heusden-Zolder (BE); Nicola Bettina Pfeffer, Eindhoven (NL); Pieter Johannes Quintus van Voorst Vader, Son (NL)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 17/732,219

(22) Filed: Apr. 28, 2022

(65) Prior Publication Data

US 2022/0256061 A1 Aug. 11, 2022

Related U.S. Application Data

(63) Continuation of application No. 16/999,401, filed on Aug. 21, 2020, now Pat. No. 11,350,022.

(30) Foreign Application Priority Data

Aug. 21, 2019 (EP) .................................... 19192749

(51) Int. Cl.
*H04N 5/225* (2006.01)
*G01B 11/22* (2006.01)
(Continued)

(52) U.S. Cl.
CPC ............ *H04N 23/56* (2023.01); *G01B 11/22* (2013.01); *G06T 7/50* (2017.01); *H04N 23/71* (2023.01);
(Continued)

(58) Field of Classification Search
None
See application file for complete search history.

(56) References Cited

U.S. PATENT DOCUMENTS 8,403,220 B2   3/2013  Fukuba et al.
8,497,841 B1*  7/2013  Sze ........................ G06F 3/0416
                                                           345/158
(Continued)

FOREIGN PATENT DOCUMENTS

CN   102165463 A   8/2011
CN   105518485 A   4/2016
(Continued)

OTHER PUBLICATIONS

"U.S. Appl. No. 16/999,401 Preliminary Amendment filed Oct. 14, 2020", 5 pgs.
(Continued)

*Primary Examiner* — Edemio Navas, Jr.
(74) *Attorney, Agent, or Firm* — Schwegman, Lundberg & Woessner, P.A.

(57) ABSTRACT

The invention describes an infrared imaging assembly (1) for capturing an infrared image (M0, M1) of a scene (S), comprising an infrared-sensitive image sensor (14); an irradiator (10) comprising an array of individually addressable infrared-emitting LEDs, wherein each infrared-emitting LED is arranged to illuminate a scene region (S1, . . . , S9); a driver (11) configured to actuate the infrared irradiator (10) by applying a switching pulse train (T1, . . . , T9) to each infrared-emitting LED; an image analysis module (13) configured to analyse a preliminary infrared image (M0) to determine the required exposure levels (130) for each of a plurality of image regions (R1, . . . , R9); and a pulse train adjusting unit (12) configured to adjust the duration (L1, . . . , L9) of a switching pulse train (T1, . . . , T9) according to the required exposure levels (130). The inven-
(Continued)

tion also described a method of generating a depth map (D) for a scene (S); a depth map generator comprising an embodiment of the inventive infrared imaging assembly (1); and a camera comprising such a depth map generator (2).

20 Claims, 6 Drawing Sheets

(51) Int. Cl.
  *G06T 7/50* (2017.01)
  *H04N 5/235* (2006.01)
  *H04N 23/56* (2023.01)
  *H04N 23/71* (2023.01)
  *H05B 45/32* (2020.01)

(52) U.S. Cl.
  CPC .... *H05B 45/32* (2020.01); *G06T 2207/10048* (2013.01)

(56) References Cited

U.S. PATENT DOCUMENTS

| | | | |
|---|---|---|---|
| 8,761,594 | B1 | 6/2014 | Gross et al. |
| 10,466,359 | B2 * | 11/2019 | Meir ................. G01S 17/06 |
| 10,509,126 | B2 | 12/2019 | Van Der Tempel et al. |
| 11,350,022 | B2 | 5/2022 | Van Der Sijde et al. |
| 2006/0180670 | A1 | 8/2006 | Acosta et al. |
| 2008/0266283 | A1 * | 10/2008 | Suzuki ................. H05B 45/37 345/213 |
| 2009/0259709 | A1 | 10/2009 | Nikitin |
| 2015/0109461 | A1 * | 4/2015 | Ahuja ................. H04R 29/007 348/187 |
| 2015/0160340 | A1 | 6/2015 | Grauer et al. |
| 2019/0110677 | A1 * | 4/2019 | Walsh ................. A61B 3/158 |
| 2020/0025932 | A1 * | 1/2020 | Saitou ................. G01S 7/4868 |
| 2020/0404246 | A1 * | 12/2020 | Beshinski ............ H04N 13/254 |
| 2021/0058539 | A1 | 2/2021 | Van Der Sijde et al. |

FOREIGN PATENT DOCUMENTS

| | | | |
|---|---|---|---|
| CN | 114930192 | A | 8/2022 |
| EP | 3605141 | A1 | 2/2020 |
| TW | 202120956 | A | 6/2021 |
| WO | WO-2018/180391 | A1 | 10/2018 |
| WO | WO-2019/020395 | A1 | 1/2019 |
| WO | WO-2019020395 | A1 * | 1/2019 ............. G01S 17/06 |
| WO | WO-2021/032831 | A1 | 2/2021 |

OTHER PUBLICATIONS

"U.S. Appl. No. 16/999,401, Final Office Action dated Nov. 1, 2021", 15 pgs.
"U.S. Appl. No. 16/999,401, Non-Final Office Action dated Jun. 24, 2021", 13 pgs.
"U.S. Appl. No. 16/999,401, Notice of Allowance dated Jan. 31, 2022", 10 pgs.
"U.S. Appl. No. 16/999,401, Response filed Jan. 3, 2022 to Final Office Action dated Nov. 1, 2021", 11 pgs.
"U.S. Appl. No. 16/999,401, Response filed Sep. 24, 2021 to Non-Final Office Action dated Jun. 24, 2021", 10 pgs.
"European Application Serial No. 19192749.0, Extended European Search Report dated Feb. 25, 2020", 7 pgs.
"International Application Serial No. PCT/EP2020/073318, International Preliminary Report on Patentability dated Mar. 3, 2022", 8 pgs.
"International Application Serial No. PCT/EP2020/073318, International Search Report dated Nov. 11, 2020", 3 pgs.
"International Application Serial No. PCT/EP2020/073318, Written Opinion dated Nov. 11, 2020", 6 pgs.
"Taiwanese Application Serial No. 109127383, Office Action dated Aug. 21, 2020", (w/ English Translation), 4 pgs.
"European Application Serial No. 20757351.0, Response filed Sep. 15, 2022 to Communication pursuant to Rules 161(1) and 162 EPC dated Mar. 29, 2022", 34 pgs.
"Chinese Application Serial No. 202080073748.8, Office Action dated Feb. 4, 2023", (w/ English Translation), 37 pgs.
"Chinese Application Serial No. 202080073748.8, Office Action dated Aug. 9, 2023", w/o English Translation, 5 pgs.
"Chinese Application Serial No. 202080073748.8, Response filed Jun. 2, 2023 to Office Action dated Feb. 4, 2023", w/ English claims, 20 pgs.

* cited by examiner

PULSE CHAIN-DRIVEN INFRARED IMAGING ASSEMBLY

PRIORITY APPLICATION

This application is a continuation of U.S. application Ser. No. 16/999,401, filed Aug. 21, 2020, which claims the benefit of priority to European Patent Application Serial Number 19192749.0, filed Aug. 21, 2019, which are incorporated herein by reference in their entireties.

TECHNICAL FIELD

The invention describes an infrared imaging assembly and a method of generating a depth map of a scene.

BACKGROUND

Depth maps are useful in various applications such as face recognition, gesture recognition, machine vision, autonomous vehicles, aerial topographic imaging, etc. Usually, a scene (the region that can be imaged by a camera with a certain field of view) is illuminated using infrared (IR) light, since this is not perceptible to the human eye, and an image of the illuminated scene is captured by an infrared-sensitive sensor array. A technique such as time-of-flight (TOF) imaging can be used to measure depths in a scene by effectively measuring the phase shift of the reflected light that reaches an image sensor, for example an array of photodetectors. The phase shift is proportional to the distance the light has travelled from the light source to the scene and back to the image sensor. To determine the phase shift, the light from the light source is modulated with a certain frequency. The image sensor demodulates the received light with the same frequency.

The accuracy of the depth map will depend (among others) on how well the scene is illuminated. A scene including bright and dark objects as well as near and remote objects may result in an inaccurate depth map if the light directed at the scene is uniform, i.e. with the same intensity over the field of view. To address this problem, the scene can be illuminated using a segmented IR irradiator, i.e. an array of individually addressable semiconductor light sources such as vertical-cavity surface-emitting lasers (VCSELs) or light-emitting diodes (LEDs) that emit in the near-infrared range, and the current of an array segment can be increased in order to increase the illumination of the corresponding scene region, or decreased in order to decrease the illumination of the corresponding scene region. However, modifying the current in this way is associated with problems, since phase detection is sensitive to changes in waveform, and any alteration to the waveform applied to an IR-emitter may decrease the accuracy of the phase detection.

Therefore, it is an object of the invention to provide a way of generating a depth map that avoids the problems outlined above.

SUMMARY

The object of the invention is achieved by the infrared imaging assembly of claim 1 and by the method of claim 8 of generating a depth map of a scene.

According to the invention, the infrared imaging assembly comprises an infrared-sensitive image sensor; an irradiator comprising an array of individually addressable infrared-emitting LEDs, wherein each infrared-emitting LED is arranged to illuminate a scene region; a driver configured to actuate the infrared irradiator by applying a switching pulse train to each infrared-emitting LED; an image analysis module configured to analyse a preliminary infrared image to determine the required exposure levels for each of a plurality of image regions; and a pulse train adjusting unit configured to adjust a parameter of a switching pulse train according to the required exposure levels.

In the context of the invention, the term "switching pulse train" is to be understood as a sequence of pulses applied to an addressable IR-LED in order to rapidly switch it on and off during the integration time of the image sensor; the preliminary image shall be understood to comprise a number of distinct parts, wherein each part corresponds to a scene region that was illuminated by a specific segment of the irradiator, e.g. a specific IR-LED. The preliminary image need not be an "image" in the conventional sense of the term, but could instead be defined as a collection of values that relate to the illumination of the scene. Of course, if the preliminary image is captured using an image sensor array, it could comprise a corresponding array of pixel values. There are alternative ways of obtaining a preliminary image, as will be explained in the following.

The preliminary infrared image serves to identify any scene regions that have received too much light or too little light. Preferably, the image analysis module is configured to process the preliminary image as a set of image regions, each image region corresponding to a scene region, whereby each scene region was illuminated by a specific IR-LED of the irradiator. The image analysis module is preferably configured to determine the exposure level of each image region, and may apply any suitable technique or algorithm to identify such regions. For example, the average brightness of each imaged region may be determined and compared to a predefined threshold to determine the required exposure for the corresponding scene region. With such information, the pulse train adjusting unit alters or adjusts a parameter of the switching pulse trains that will be used to capture a subsequent image, so that each IR-LED delivers the amount of energy that is necessary to correctly illuminate the associated scene region. The "subsequent image" shall be understood to comprise a phase value and an amplitude value per pixel of the image sensor. The subsequent image is optimally exposed, and is less affected by stray light, and can therefore be used to generate a more accurate depth map. An advantage of the inventive infrared imaging assembly is that it is relatively straightforward to realise and can deliver correctly exposed infrared images, which in turn can be used to generate accurate depth maps. Furthermore, the inventive infrared imaging assembly can be realised by adapting the driver software and image processing software of an existing infrared imaging assembly that already comprises a suitable segmented IR irradiator, i.e. an array of individually addressable infrared-emitting LEDs.

According to the invention, a depth map generator comprises an embodiment of such an infrared imaging assembly, and a camera comprises an embodiment of such a depth map generator. For example, the camera module of a mobile device may incorporate components of both a visible-spectrum imaging arrangement as well as a depth map generator as described above. The control of the various components may be managed by a shared driver, for example, to synchronize the timing of various steps to generate a depth map for a scene and to subsequently capture a visible-spectrum image of the scene.

The inventive method of generating a depth map for a scene, when using such an infrared imaging assembly, comprises the steps of actuating the infrared irradiator by applying switching pulse trains of equal duration to each infrared-emitting LED; capturing a preliminary image; analysing the preliminary image to determine a required exposure level for each of a plurality of image regions; adjusting a parameter of the switching pulse trains according to the required exposure levels; actuating the infrared irradiator by applying the adjusted switching pulse trains to the infrared-emitting LEDs; capturing a subsequent image; and computing a depth map from the subsequent image.

It shall be understood that the same parameter is adjusted—as deemed necessary—for each switching pulse train. That parameter can be adjusted to a different extent for each IR-LED. Equally, it may considered necessary to only adjust that parameter for a small number of the IR-LEDs. For example, the infrared irradiator may be realised as an array of 16 IR-LEDs, and analysis of the preliminary image may indicate that five of the 16 scene regions received too much light and three scene regions did not receive sufficient light. The parameter of the switching pulse train of an IR-LED corresponding to an overexposed region may be adjusted "downward" to reduce the amount of light directed at that scene region. Similarly, the parameter of the switching pulse train of an IR-LED corresponding to an underexposed region may be adjusted "upward" to increase the amount of light directed at that scene region.

The dependent claims and the following description disclose particularly advantageous embodiments and features of the invention. Features of the embodiments may be combined as appropriate. Features described in the context of one claim category can apply equally to another claim category.

In the following, without restricting the invention in any way, it may be assumed that the IR-LEDs emit in the near-infrared range, i.e. with a wavelength range between 700 nm and 1400 nm.

The infrared imaging assembly may be used in a time-of-flight camera, which can be realised to apply the principle of continuous-wave modulation or pulsed modulation as appropriate. Preferably, the camera is realised to apply continuous-wave modulation, since this allows a favourably high resolution such as quarter-VGA.

As explained above, a "switching pulse train" is a sequence of pulses applied to an addressable IR-LED to rapidly switch it on and off. A parameter of a switching pulse train may be its duty cycle, the amplitude of the pulses, etc. Altering the amplitude of the pulses in a pulse train may be complicated to realise, since an increase in current may lead to pulse shape distortion on account of the temperature dependency of a semiconductor diode. It may also be difficult to realise an alteration in duty cycle, because corresponding alterations would be required for the image analysis algorithm. Therefore, in a particularly preferred embodiment of the invention, the duty cycle of a pulse train is 50%, and the pulse train adjusting unit is preferably configured to adjust the length of a switching pulse train for an IR-LED in order to adjust the amount of light directed at the corresponding scene region. Preferably, a pulse train is a periodic wave of identical pulses. A pulse can have a simple shape such as a rectangular, triangular or sinusoidal shape, but can equally have a more complex shape. A "pulse train length" or "pulse train duration" can be defined as the number of pulses in that pulse train, so that the duration of the pulse train is determined by the wavelength or spatial period multiplied by the pulse count. Alternatively, the pulse train duration can be expressed as a length of time, so that the pulse count is determined by the pulse train duration divided by the wavelength. Preferably, the pulse train adjusting unit will decrease the length of the switching pulse train for an IR-LED corresponding to an overexposed image region, and increase the length of the switching pulse train for an IR-LED corresponding to an underexposed image region. The maximum duration of a switching pulse train is determined by the sensor integration time. A long switching pulse train may be effective in correctly illuminating dark and/or remote objects in the scene, whereas a short switching pulse train may be effective in correctly illuminating bright and/or near objects in the scene.

The infrared-sensitive image sensor may comprise a 1-dimensional or 2-dimensional array of IR-sensitive pixels, for example, a quarter-VGA array of 320×240 IR-sensitive pixels for a dedicated TOF camera. Such an image sensor can provide sufficiently detailed information to a depth map computation algorithm. The integration time of such an image sensor may be in the order of 100 µs. In a camera or any device incorporating a camera for the purpose of generating visible-spectrum images, the infrared-sensitive image sensor is preferably realised as a dedicated IR image sensor.

The phase detectors of an infrared image sensor may be realised in a number of ways, as will be known to the skilled person. Usually, a pixel of an infrared image sensor is realised using a photosensitive area and a number of semiconductor switches. Depending on the realisation of the image sensor, it may be read sequentially up to four time during capture of a single image. Preferably, each pixel of the IR image sensor array comprises at least two phase detectors for demodulation at two distinct phase shifts. In a particularly preferred embodiment, each pixel of the IR image sensor array comprises four demodulation channels at phase-shifts of 0°, 90°, 180°, and 270°. The detected signals can be combined for favourably robust phase detection, e.g. phase detection that is insensitive to intensity variations, etc.

In a preferred embodiment of the invention, the infrared imaging assembly further comprises a single infrared-sensitive photosensor to capture basic scene illumination information. In such an embodiment, the IR-LEDs are briefly actuated in sequence, and the single IR photosensor records a mean brightness level of the corresponding scene region. In such an embodiment, the single IR photosensor provides information that is recorded as a sequence of intensity values, wherein each intensity value corresponds to a scene region. For an exemplary array of nine IR-LEDs, each is briefly actuated and the single IR photosensor records nine brightness levels. The set of brightness levels is regarded as the preliminary image in this embodiment. The brightness levels are used as a basis for adjusting the pulse trains of the IR-LEDs in a subsequent imaging step in which a final image of the scene is captured by the IR-image sensor array. In a preferred embodiment of the invention, the duration of the scan sequence—in which a very short pulse train is applied to each IR-LED in turn—is very brief and only comprises at most a few percent, preferably at most 2%, of the IR sensor integration time. In this embodiment, the scan sequence could be carried out to detect the required irradiance levels for the preliminary image of an image acquisition event while the camera is busy recording the final image of a previous image acquisition event. Alternatively, the scan sequence can be done during "dead time" of a previous image acquisition event in which analog-digital conversion and 3D map computation are taking place. In this embodiment, the shape of the pulse train can be optimized to achieve the best signal-to-noise ratio for the single photosensor. An advantage of applying the scan sequence during the "dead time" of the TOF camera is that the pulse train is then no longer bound to the camera's 50% duty cycle requirement.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
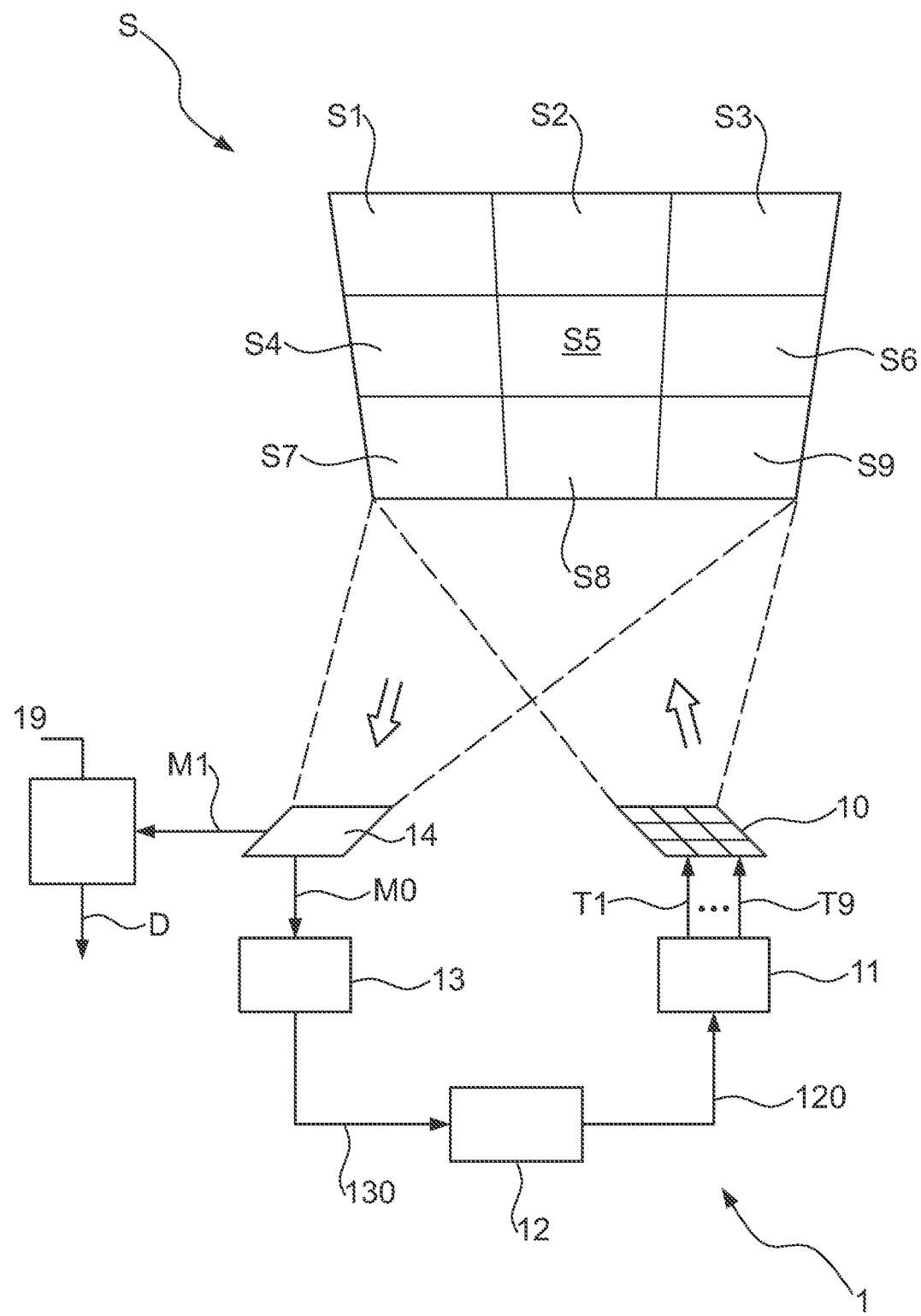
FIG. 1 is a simplified schematic of an embodiment of the inventive infrared imaging assembly.

FIG. 1 is a simplified schematic diagram that shows an exemplary embodiment of the inventive infrared imaging assembly 1. The diagram shows an IR irradiator 10, realised in this embodiment as a "segmented array" of nine IR-LEDs in a 3×3 arrangement. Each IR-LED is individually addressable. A driver 11 is configured to actuate the IR-LEDs by applying nine switching pulse trains T1, ..., T9 as described above, one pulse train for each segment of the irradiator. When actuated, the IR-LED irradiator 10 can illuminate a scene S, whereby each IR-LED illuminates a scene region S1, ..., S9.

The diagram also indicates an infrared-sensitive image sensor 14 arranged to capture an image of the scene S. Initially, a preliminary image M0 is captured by illuminating the scene with switching pulse trains of equal duration. Since each IR-LED illuminates a scene region S1, ..., S9, an image captured by the image sensor 14 can be virtually divided into nine regions, and an image analysis module 13 can process each image region to determine whether the corresponding scene region S1, ..., S9 was correctly illuminated by the corresponding IR-LED. The image sensor is preferably a dedicated TOF image sensor so that phase-shifts of 0°, 90°, 180°, and 270° are considered in the preliminary image M0 and the final image M1. With the image analysis results 130, i.e. the required exposure levels 130 for the scene regions S1, ..., S9, a pulse train adjusting unit 12 adjusts the durations of the switching pulse trains T1, ..., T9. The driver 11 then applies the information 120 to ensure that pulse trains T1, ..., T9 with the adjusted durations are applied to the IR irradiator 10 and a correctly exposed image M1 is recorded.

Figure 2:
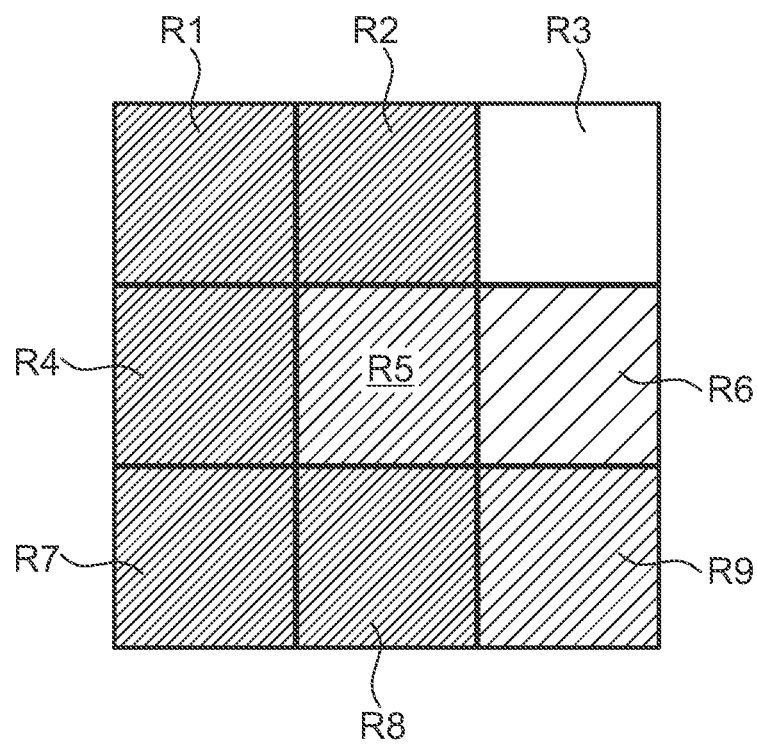
FIG. 2 is a simplified representation of mean brightness levels determined for a preliminary image.
Figure 3:
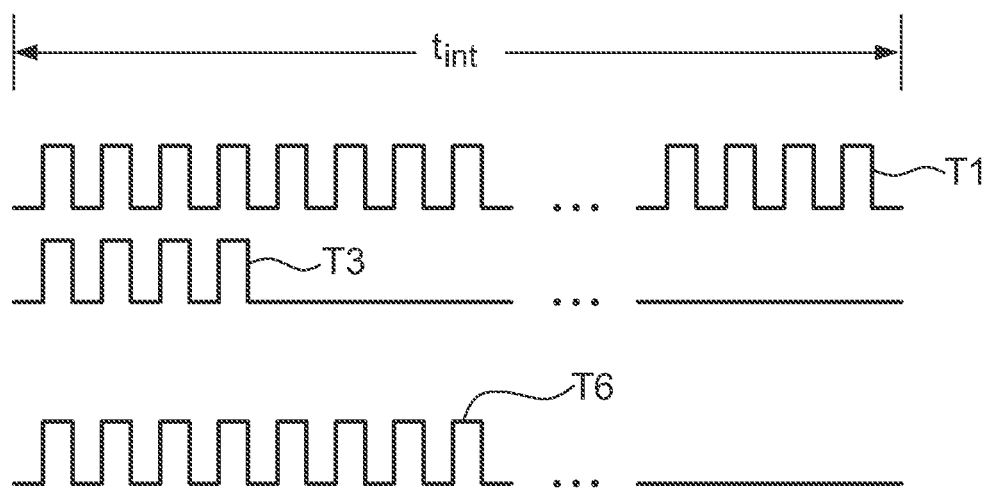
FIG. 3 shows a set of exemplary pulse trains for an IR irradiator.

FIG. 2 shows a simplified representation of mean brightness levels determined for a preliminary image M0. After image analysis, the mean brightness levels have been determined for the nine regions R1, ..., R9 corresponding to the nine scene regions S1, ..., S9 mentioned in FIG. 1. A dark image region (e.g. image region R1, R2, R4, R7, R8) corresponds to a scene region that will benefit from more illumination, while a bright image region (e.g. image region R3, R5, R6, R9) corresponds to a scene region that will benefit from less illumination. FIG. 3 shows how this information may be translated into altered pulse trains for the IR-LEDs of the irradiator 10. A switching pulse train T1 for the IR-LED that will illuminate the scene region corresponding to image region R1 has a duration that extends over the image sensor integration time $t_{int}$. A switching pulse train T3 for the IR-LED that will illuminate the scene region corresponding to image region R3 has a much shorter duration that extends over only a fraction of the image sensor integration time $t_{int}$. A switching pulse train T6 for the IR-LED that will illuminate the scene region corresponding to image region R6 is longer than the switching pulse train T3 but significantly shorter than the image sensor integration time $t_{int}$.

Figure 4:
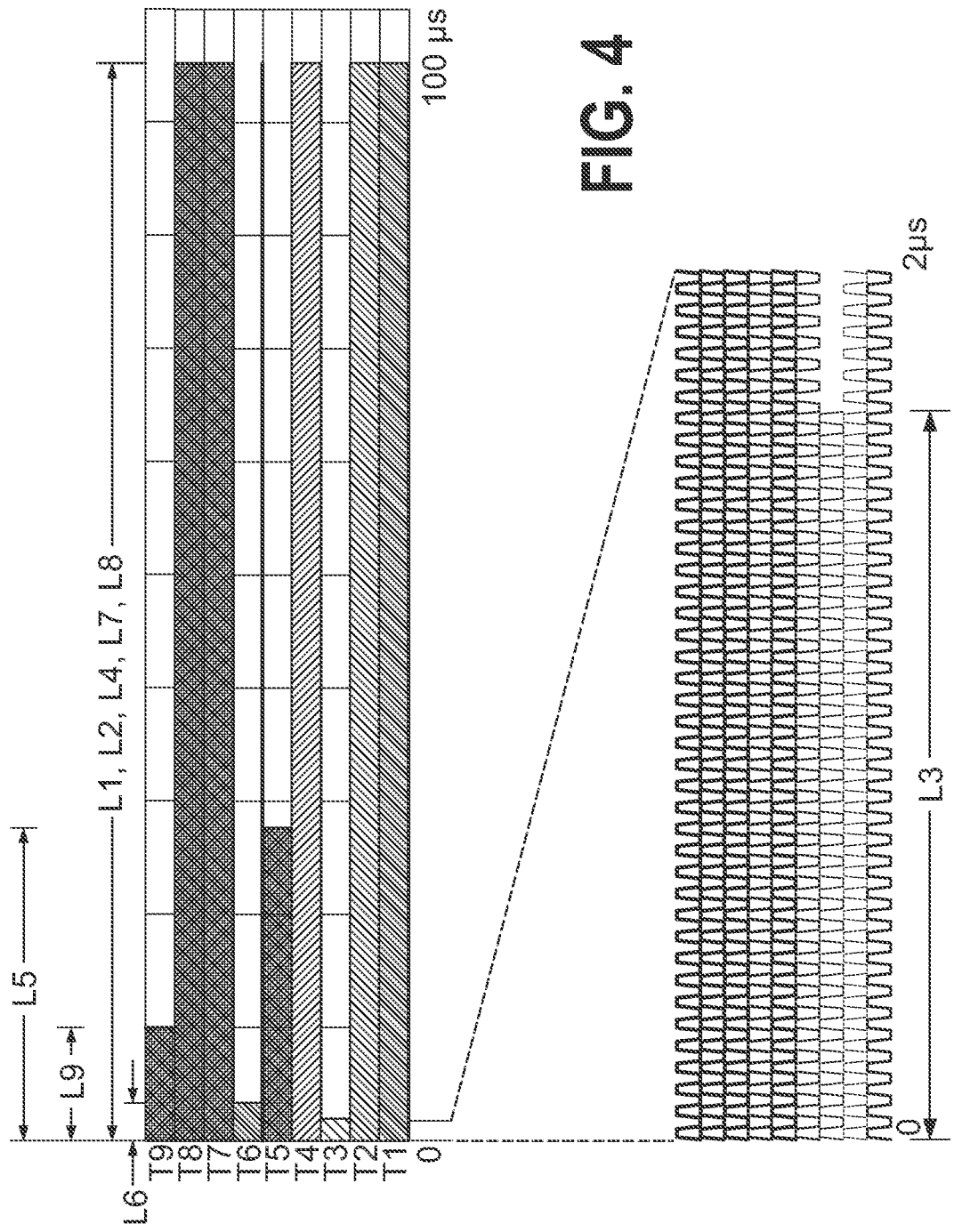
FIG. 4 shows exemplary pulse trains for the IR irradiator of FIG. 1.

This is illustrated also in FIG. 4, which shows nine pulse trains T1, ..., T9 for the nine IR-LEDs of the irradiator 10 in FIG. 1, and the durations of the pulse trains T1, ..., T9 have been adjusted after processing the preliminary image M0 as explained in FIG. 2. The sensor integration time $t_{int}$ is 100 μs in this example. The diagram shows exemplary durations L1, ..., L9 for the nine pulse trains T1, ..., T9. The lower part of the diagram shows the time from 0-2 μs in more detail, and also shows the rectangular shape of the exemplary pulse train applied to each IR-LED. This part of the diagram also shows the completion of the pulse train T3 applied to the IR-LED that will illuminate the scene region corresponding to image region R3 in FIG. 2.

Returning to FIG. 1, the final image M1 is optimally illuminated by the IR irradiator 10, and can be used by a depth map computation unit 19 to generate an accurate depth map D. This in turn may be used by an application such as a face recognition application, a gesture recognition application, an augmented reality application, localization and mapping technologies, etc. A depth map generator may include the depth map computation unit 19 as well as the infrared imaging assembly 1 and may be provided as a module to be used in such an application. The depth map generator may also be used in conjunction with a visible-spectrum imaging assembly.

Figure 5:
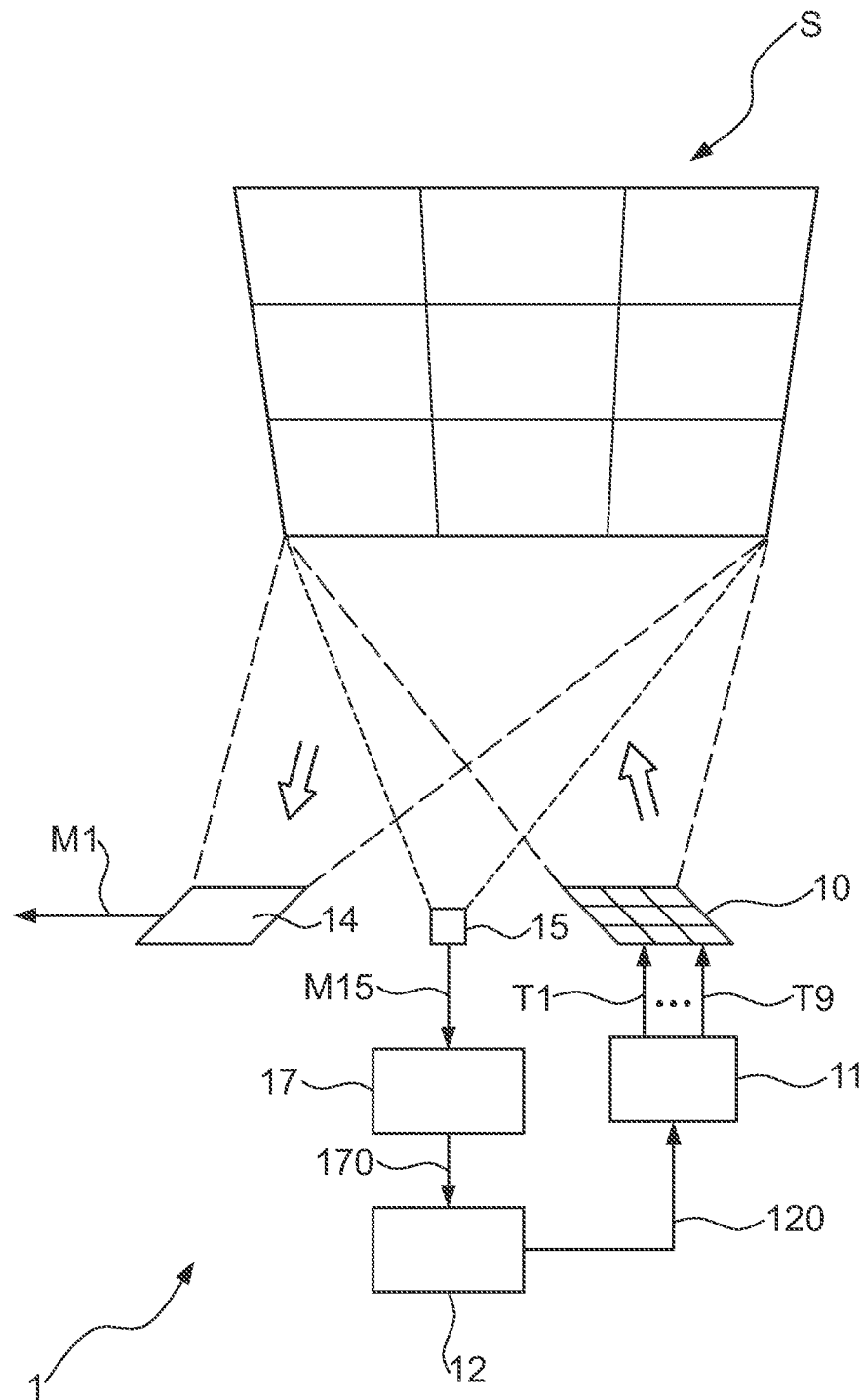
FIG. 5 shows a further embodiment of the inventive infrared imaging assembly.

FIG. 5 shows a further embodiment of the inventive infrared imaging assembly 1. This embodiment corresponds to the arrangement already explained in FIG. 1 above, with the addition of a single photosensor 15. In this embodiment, the sequence of events may be summarised as follows: the driver 11 actuates each IR-LED in sequence by applying a very short pulse train. In this way, each scene region S1, ..., S9 is briefly and separately illuminated. The photosensor 15 records the returned light so that a preliminary image M15, i.e. a sequence of nine mean illumination readings from the analog-to-digital converter (ADC) of the photosensor 15, is obtained. In a processing unit 17, the mean illumination readings are analysed to determine required exposure levels 170 which in turn are forwarded to the pulse train adjusting unit 12, which adjusts the lengths of the switching pulse trains T1, ..., T9 that will be used to generate the final image M1. The driver 11 then applies the adjusted pulse trains to the IR irradiator 10 and a favourably accurate final image M1 is then recorded.

Figure 6:
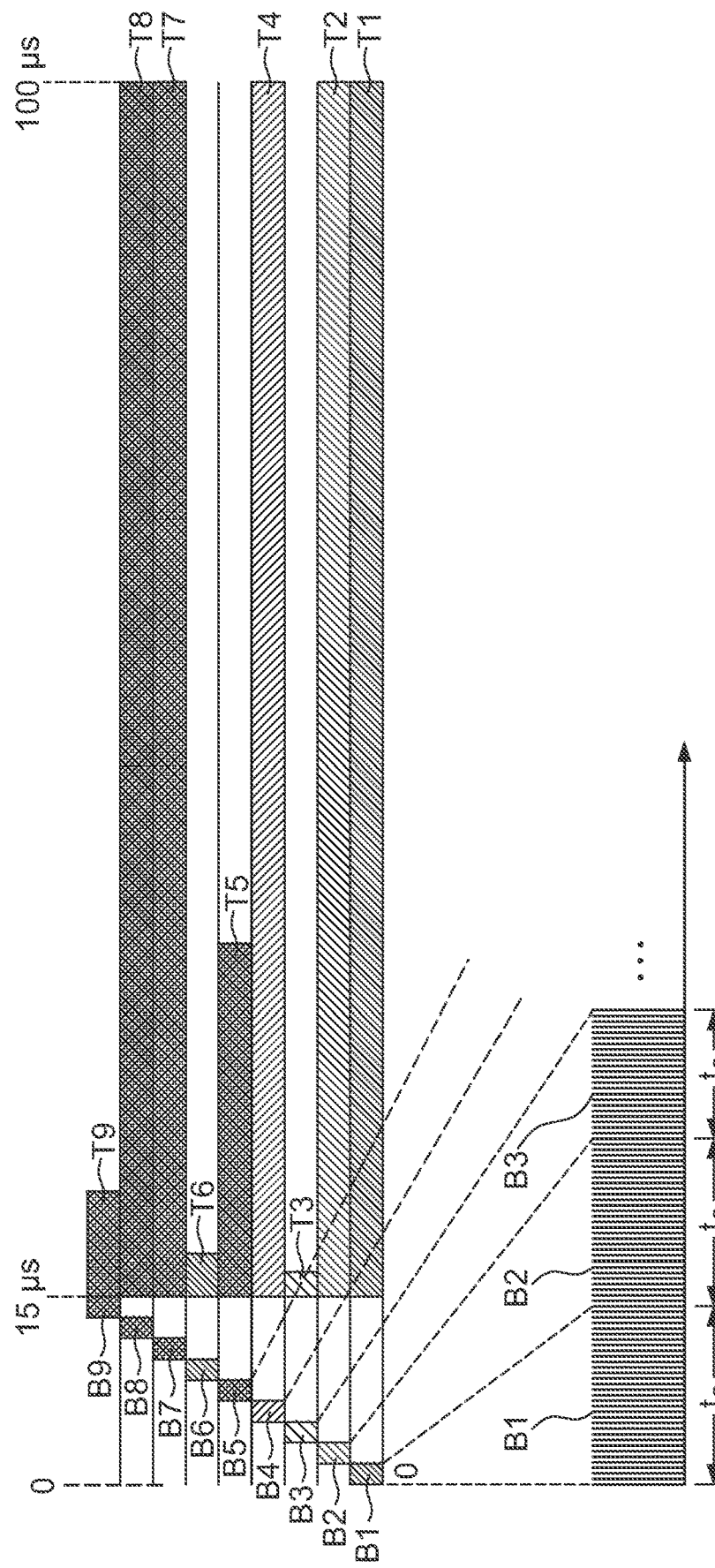
FIG. 6 shows exemplary pulse trains to illustrate the embodiment of FIG. 5.

FIG. 6 shows exemplary pulse trains T1, ..., T9 to illustrate the embodiment explained in FIG. 5 above. The diagram shows an initial "scan" sequence in which each IR-LED is driven in turn using a very short pulse train B1, . . . , B9. Each brief pulse train B1, . . . , B9 is a square wave with a wavelength of 50 ns and is applied for a total of only 30 pulses. The duration of the entire scan sequence is therefore only about 15 µs. The scene regions S1, . . . , S9 are illuminated one after the other using this scan sequence, and the photosensor 15 records a series of mean illumination levels (the preliminary image M15), which in turn is used to decide on an optimal pulse train length for the pulse trains T1, . . . , T9 that will be applied to the IR irradiator 10 in a subsequent step.

Figure 7:
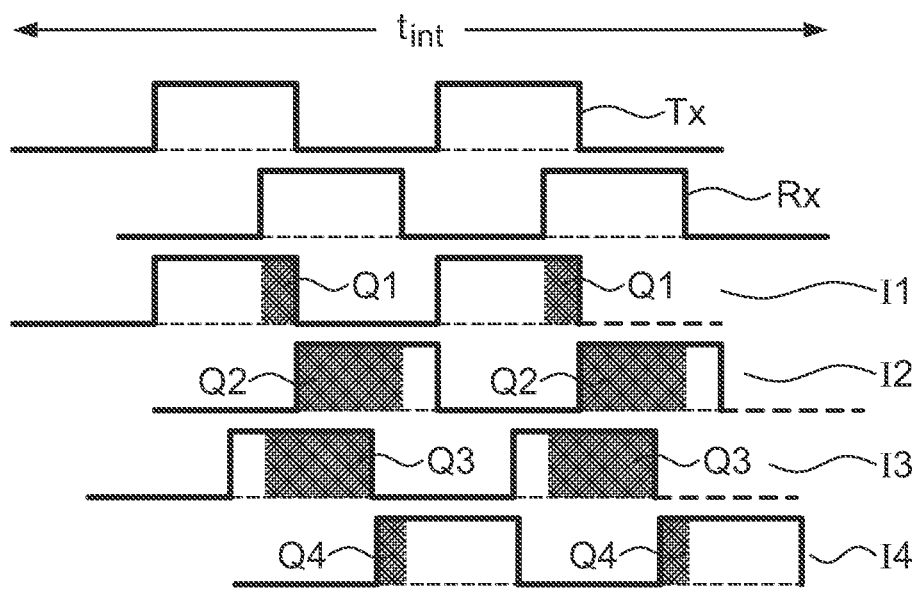
FIG. 7 illustrates the principle of operation of a TOF image sensor.

FIG. 7 illustrates the principle of operation of a quarter-VGA image sensor, in which each pixel can detect phase-shifts of 0°, 90°, 180°, and 270°. The diagram shows a light pulse train Tx leaving the irradiator, and the reflected light pulse train Rx. The diagram also shows the response (labelled I1-I4) of the phase detectors, with the total signal strength Q1, Q2, Q3, Q4 recorded in each case.

The phase shift $\varphi$ is calculated from the relationship $$\varphi = \arctan\left(\frac{Q_3 - Q_4}{Q_1 - Q_2}\right)$$

The distance d of a pixel in the scene to the image sensor array is computed from the relationship $$d = \frac{c}{4\pi f}\varphi$$

where c is the speed of light, and f is the modulation frequency of the light source.

Although the present invention has been disclosed in the form of preferred embodiments and variations thereon, it will be understood that numerous additional modifications and variations could be made thereto without departing from the scope of the invention. For example, instead of a segmented irradiator of IR-LEDs, the irradiator may comprise one or more VCSELs in each segment. These can also be operated using the adaptive pulse train concept described above. The imaging assembly could also instead be realised to operate in the visible range, for example by using a visible-light image sensor and a visible-light emitter. Furthermore, the imaging assembly can comprise two irradiators, each of which is arranged to illuminate one half of the scene. Suitable imaging optics may be used for beam forming the light from each irradiator. Alternatively, the imaging assembly can comprise a beam-forming lens for each segment of the irradiator. The skilled person will be familiar with the various arrangements that are possible. For example, instead of using a fast processor for performing image analysis, a dedicated integrated circuit may be used. Furthermore, the dynamic range of the inventive imaging assembly can be increased by having a limited number of pre-set currents with known depth calibration that can be used in combination with the adaptive pulse train.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

REFERENCE SIGNS infrared imaging assembly 1
IR-LED array 10
driver 11
pulse train adjusting unit 12
length adjustment information 120
phase analysis unit 13
phase analysis results 130
IR image sensor 14
photosensor 15
processing module 17
mean illumination reading 170
depth map module 19
scene
scene region S1, . . . , S9
image region R1, . . . , R9
switching pulse train T1, . . . , T9
brief pulse train B1, . . . , B9
pulse train length L1, . . . , L9
preliminary image M0, M15
final image M1
image sensor integration time $t_{int}$
depth map D
light pulse train Tx
reflected light pulse train Rx
phase detector response I1, I2, I3, I4
phase detector signal strength Q1, Q2, Q3, Q4

The invention claimed is:

1. An infrared imaging assembly to capture an infrared image of a scene, the infrared imaging assembly comprising:
   an infrared-sensitive image sensor;
   an irradiator comprising an array of individually addressable infrared-emitting LEDs, each infrared-emitting LED arranged to illuminate at least one image region of a plurality of image regions of the scene;
   a driver configured to actuate the irradiator by applying a switching pulse train to each infrared-emitting LED;
   an image analyzer configured to analyze a preliminary image of the scene irradiated by the irradiator to determine exposure levels for each of the plurality of image regions, the driver configured to use pulses of a preliminary switching pulse train to drive each infrared-emitting LED during a scan sequence in which the preliminary image is captured; and
   an adjusting unit configured to adjust driving of each infrared-emitting LED based on the exposure levels to obtain a final image, the preliminary switching pulse train having a shorter duration than a final switching pulse train used to drive the infrared-emitting LED to obtain the final image, the pulses of the preliminary switching pulse train having a shorter pulse width than pulses of the final switching pulse train.

2. The infrared imaging assembly according to claim 1, wherein the preliminary image of the scene is obtained from a previous frame and analysis and driving of each of the individually addressable infrared-emitting LEDs is configured to be adjusted during a current frame.

3. The infrared imaging assembly according to claim 1, wherein:
   each infrared-emitting LED is arranged to illuminate a different image region of the plurality of image regions, and
   the image analyzer is configured to determine the exposure level for each image region by determination of an average brightness of the image region and comparison of the average brightness to a predefined threshold.

4. The infrared imaging assembly according to claim 1, wherein the adjusting unit is configured to adjust a duration of the final switching pulse train used to drive each of the individually addressable infrared-emitting LEDs based on the exposure levels.

5. The infrared imaging assembly according to claim 1, wherein the driver is configured to adjust a number of pulses of the final switching pulse train to each of the individually addressable infrared-emitting LEDs, a duty cycle of the final switching pulse train having a value of a 50%.

6. The infrared imaging assembly according to claim 1, wherein a maximum duration of the final switching pulse train to each of the individually addressable infrared-emitting LEDs is determined by a sensor integration time of the infrared-sensitive image sensor.

7. The infrared imaging assembly according to claim 1, wherein a duration of the final switching pulse train to each of the individually addressable infrared-emitting LEDs is determined by both an amount of illumination of the image region associated with infrared-emitting LED and distance of the image region from the irradiator.

8. The infrared imaging assembly according to claim 1, wherein a duration of the preliminary switching pulse train is limited to at most 2% of a sensor integration time of the infrared-sensitive image sensor.

9. The infrared imaging assembly according to claim 1, wherein the driver is configured to adjust a same parameter of the final switching pulse train for each of a limited number of the individually addressable infrared-emitting LEDs, the parameter able to be adjusted differently for each of the limited number of the individually addressable infrared-emitting LEDs.

10. The infrared imaging assembly according to claim 1, wherein the adjusting unit is configured to adjust the final switching pulse train applied to each of the individually addressable infrared-emitting LEDs based on pulse shape distortion caused by a temperature dependency of each of the individually addressable infrared-emitting LEDs.

11. The infrared imaging assembly according to claim 1, wherein each pixel of the image sensor:
is to be read sequentially four times during capture of a single image, and
comprises four phase detectors for demodulation at using four demodulation channels of phase shifts of about 0°, about 90°, about 180°, and about 270°.

12. The infrared imaging assembly according to claim 11, wherein the image analyzer is configured to determine a distance between the infrared-sensitive image sensor and the scene dependent on a combined phase shift that combines signal strengths at each of the phase shifts of the demodulation channels.

13. The infrared imaging assembly according to claim 1, wherein the driver is configured to drive each infrared-emitting LED an identical number of times using a single set of pulses during the scan sequence.

14. A camera comprising:
an infrared imaging assembly comprising:
an infrared-sensitive image sensor;
an irradiator comprising an array of individually addressable infrared-emitting LEDs, each infrared-emitting LED arranged to illuminate at least one image region of a plurality of image regions of a scene;
a driver configured to actuate the irradiator by applying a switching pulse train to each infrared-emitting LED;
an image analyzer configured to analyze, during a current frame, a preliminary image of the scene irradiated by the irradiator during a previous frame to determine exposure levels for each of the plurality of image regions, the driver configured to use pulses of a preliminary switching pulse train to drive each infrared-emitting LED during a scan sequence in which the preliminary image is captured; and
an adjusting unit configured to adjust driving during the current frame of each infrared-emitting LED based on the exposure levels to obtain a final image, the preliminary switching pulse train having a shorter duration than a final switching pulse train used to drive the infrared-emitting LED to obtain the final image, the pulses of the preliminary switching pulse train having a shorter pulse width than pulses of the final switching pulse train.

15. The camera according to claim 14, wherein:
the camera is a time-of-flight (TOF) camera configured to apply continuous-wave modulation to generate images during the previous and current frame, and
the camera further comprises a depth map generator configured to use each of the plurality of image regions, illuminated using the preliminary switching pulse train of approximately equal duration to drive each of the plurality of image regions during the preliminary image, to determine adjustment of the switching pulse train to each of the plurality of image regions during the current frame and computation of a depth map from the current frame based on TOF information of each of the plurality of image regions.

16. The camera according to claim 15, wherein:
each pixel of the image sensor is to be read sequentially four times during capture of a single image,
each pixel of the image sensor comprises four phase detectors for demodulation at using four demodulation channels of phase shifts of about 0°, about 90°, about 180°, and about 270°, and
a phase shift of reflected light that reaches the image sensor for each pixel is used to determine the TOF information.

17. The camera according to claim 15, wherein the image analyzer is configured to determine a distance between the infrared-sensitive image sensor and the scene dependent on a combined phase shift that combines signal strengths at a phase shift of each pixel.

18. The camera according to claim 15, wherein:
a duration of the preliminary switching pulse train is limited to at most 2% of a sensor integration time of the infrared-sensitive image sensor, and
components of the camera are synchronized by the driver.

19. A controller comprising:
at least one processor configured to:
receive sensor signals from an infrared-sensitive image sensor, the sensor signals generated by illumination of a plurality of image regions of a scene illuminated by an array of individually addressable infrared-emitting LEDs;
analyze, during a current frame, a preliminary image of the scene illuminated during a previous frame to determine exposure levels for each of the plurality of image regions, the preliminary image obtained using pulses of a preliminary switching pulse train to drive each infrared-emitting LED during a scan sequence in which the preliminary image is captured; and
generate, for transmission to an adjusting unit, adjustment signals to adjust driving during the current frame of each of the individually addressable infrared-emitting LEDs based on the exposure levels to obtain a final image, the preliminary switching pulse train having a shorter duration than a final switching pulse train used to drive the infrared-emitting LED to obtain the final image, the pulses of the preliminary switching pulse train having a shorter pulse width than pulses of the final switching pulse train.

20. The controller according to claim 19, wherein the at least one processor is further configured to:

use each of the plurality of image regions, illuminated using switching pulse trains of approximately equal duration during the preliminary image, to determine adjustment of a previously applied switching pulse train to each of the plurality of image regions during the current frame and computation of a depth map from the current frame based on TOF information of each of the plurality of image regions;

receive sequential information from each pixel of the image sensor during capture of a single image to determine time of flight information, each sequential information based on a different phase shift, the phase shifts being about 0°, about 90°, about 180°, and about 270°; and determine a distance between the infrared-sensitive image sensor and the scene dependent on a combined phase shift that combines signal strengths at the phase shifts of each pixel.

* * * * *